Patented June 30, 1931

1,811,854

UNITED STATES PATENT OFFICE

GEORGE CHARLES LEWIS, OF NEW DORP, NEW YORK, ASSIGNOR TO COLUMBIAN CARBON COMPANY, OF NEW YORK, N. Y., A CORPORATION OF DELAWARE

MANUFACTURE OF CARBON BLACK

No Drawing.   Application filed April 19, 1928.   Serial No. 271,407.

In the usual method of manufacture of carbon black, natural gas consisting chiefly of methane ($CH_4$) is burned at burners so positioned that the flame impinges on a cooling surface on which the carbon black is deposited and from which it is brushed or scraped.

It is well known that the yield of carbon black so produced in respect to the total carbon content of the gas burned is very low because a very considerable proportion of the carbon is burned to carbon monoxide ($CO$) and carbon dioxide ($CO_2$), while all or substantially all of the hydrogen is burned to water vapor ($H_2O$).

A larger percentage yield of carbon may be secured in other ways, but all attempts along that line with which I am familiar have resulted in the loss or reduction of certain other desirable characteristics of carbon black, such as tinctorial strength and other physical properties of the particles.

I have discovered that by adding free hydrogen to the natural gas, methane, or other hydrocarbon gas being burned, I am able to increase the percentage yield of carbon black and at the same time, even increase those desirable properties which are characteristic of the product obtained by impingement of the flame on a cooling or collection surface.

Although the exact phenomena which occurs in the flame is difficult to determine, it is my belief that the increase in yield is due to the fact that the amount of oxygen of the air which can gain direct access to the molecules of the combustible constituents of the flame before the chilling effect of the cooling surface prevents further combustion, is somewhat limited. The oxygen apparently unites more readily with the hydrogen than with the carbon and therefore the free hydrogen must first be satisfied and then the hydrogen of the methane or other hydrocarbon gas. Thus of the oxygen of the air which enters the flame, there is the minimum amount left for chemical union with the carbon of the hydrocarbon, and there is a correspondingly greater quantity of the carbon left unconsumed for deposit in valuable form on the chilling surface.

Because free hydrogen in burning develops a high temperature, the dilution of the hydrocarbon gas with hydrogen prevents any such reduction of the temperature of the flame as might be the case if the hydrocarbon gas were diluted with an inert gas. The deposit of the carbon directly from the high temperature flame may and probably is the reason why the quality is improved over that produced by the burning of the hydrocarbon alone. Whether or not these theories properly account for the increase yield and improved quality is not material to the invention.

The percentage of free hydrogen added may vary with the gas burned. For instance, a larger amount may be used with a hydrocarbon gas containing a small percentage of combined hydrogen than with one, such as methane, which contains a large percentage of combined hydrogen.

It does not appear to be economical to add too large an amount of free hydrogen and thereby reduce the carbon content of the burning mixture below that which it is economical to deposit and collect.

The percentage of free hydrogen added may be varied depending upon whether one desired both increased yield and improved quality, or a still further improved quality with possibly a lower yield.

Tests which have been conducted with natural gas indicate that the quality continues to improve with additions of hydrogen up to seventy percent or more, but that the yield, although increased by the addition of fifteen percent, tends to fall off when the percentage of added hydrogen in respect to the natural gas increased beyond forty percent.

It will, of course, be obvious that these percentages are not to be taken as any limits, but will vary with the composition of the hydrocarbon gas being burned.

Free hydrogen may be added to or mixed with the gas in any desired manner in advance of the burner or may be liberated from the hydrocarbons of the gas by a high temperature or cracking treatment of the gas in advance of the burner.

If the gas be heated to such temperature and under such conditions as will produce benzine, toluol, napthalene, anthracene, etc., and these are separated out in advance of the burner, the percentage of hydrogen in respect to the carbon of the remaining portion of the gas which is delivered to the burner, will be correspondingly increased. If the heating or cracking operation produces any of these or other heavier hydrocarbons, and temperature conditions are maintained such that they will be carried along with the remaining gases to the burner, the relative amounts of carbon and hydrogen delivered to the burner, will not be changed, but the percentage of free hydrogen will be increased, and the yield of carbon black correspondingly increased. In either case the number of molecules of free hydrogen in respect to the number of molecules of hydrocarbon is increased.

By means of my invention I reduce the relative quantities of oxygen and hydrogen without reducing the flame temperature such as results from reduction in the oxygen supply by dilution of the combustible gas with an inert one.

Although in carrying out my invention, I have mainly in mind the production of carbon black, yet the same general advantages may be obtained for the production of lamp black where the limiting of the combustion of the carbon is brought about by a restriction in the air supply to the burner so as to produce a smoky flame rather than by the use of a chilling or cooling surface on which the flame impinges.

Broadly considered the invention involves the addition of free hydrogen or an increase in the percentage of such free hydrogen as a means of reducing the combustion of the carbon and facilitating the collection of such carbon in increased quantity or more desirable form.

Having thus described my invention what I claim as new and desire to secure by Letters Patent is:

1. The process of producing free carbon by the incomplete combustion of a hydrocarbon which includes increasing the percentage of free hydrogen in respect to the percentage of hydrocarbon in the gas, and burning the mixture in the presence of oxygen.

2. The process of producing free carbon which includes adding hydrogen to a hydrocarbon, and burning the mixture under conditions resulting in the deposit of free carbon.

3. The process of producing carbon black which includes adding hydrogen to a hydrocarbon, and burning the mixture with flame impingement on a cooling or collecting surface.

4. The process of producing carbon black which includes burning a mixture of hydrogen and a hydrocarbon gas with impingement of the flame on a cooling or collecting surface.

5. The process of obtaining carbon black of improved tinctorial strength which includes burning a mixture of hydrogen and hydrocarbon gas under conditions resulting in the deposit of the carbon black.

6. The process which consists in adding hydrogen to marsh gas, and burning the mixture with flame impingement on a cooling or collecting surface.

7. The process of producing free carbon by the incomplete combustion of methane, which includes forming a gas mixture of methane and not exceeding 40% of hydrogen, and burning the mixture with flame impingement on a collecting surface.

Signed at New York, in the county of New York, and State of New York this 16th day of April, A. D. 1928.

GEORGE CHARLES LEWIS.